(12) United States Patent
Laborie

(10) Patent No.: US 7,665,310 B2
(45) Date of Patent: Feb. 23, 2010

(54) GAS TURBINE ENGINE HAVING A COOLING-AIR NACELLE-COWL DUCT INTEGRAL WITH A NACELLE COWL

(75) Inventor: Daniel Jean-Louis Laborie, West Chester, OH (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 11/616,446

(22) Filed: Dec. 27, 2006

(65) Prior Publication Data

US 2009/0297342 A1 Dec. 3, 2009

(51) Int. Cl.
*F02C 7/12* (2006.01)
(52) U.S. Cl. .................. 60/806; 60/785; 60/782
(58) Field of Classification Search ............... 60/226.1, 60/782, 785, 804, 806
See application file for complete search history.

(56) References Cited

U.S. PATENT DOCUMENTS

| | | | | |
|---|---|---|---|---|
| 4,069,662 A | * | 1/1978 | Redinger et al. ........... 60/226.1 |
| 4,177,637 A | | 12/1979 | Pask |
| 4,279,123 A | * | 7/1981 | Griffin et al. ............... 60/226.1 |
| 4,351,150 A | | 9/1982 | Schulze |
| 4,441,314 A | * | 4/1984 | Fitton ........................ 60/266 |
| 4,504,030 A | | 3/1985 | Kniat et al. |
| 4,525,998 A | * | 7/1985 | Schwarz ................... 60/226.1 |
| 4,608,819 A | | 9/1986 | Coleman et al. |
| 5,012,639 A | * | 5/1991 | Ream et al. ................ 60/226.1 |
| 5,083,426 A | | 1/1992 | Layland |
| 5,269,135 A | | 12/1993 | Vermejan et al. |
| 5,311,735 A | * | 5/1994 | Orlando ....................... 60/204 |
| 5,351,476 A | | 10/1994 | Laborie et al. |
| 5,357,742 A | * | 10/1994 | Miller ........................ 60/785 |
| 5,553,449 A | | 9/1996 | Rodgers et al. |
| 5,899,463 A | * | 5/1999 | Koch ......................... 277/634 |
| 5,918,458 A | * | 7/1999 | Coffinberry et al. ........... 60/785 |
| 5,943,856 A | * | 8/1999 | Lillibridge et al. ............ 60/262 |
| 6,202,403 B1 | | 3/2001 | Laborie et al. |
| 6,269,628 B1 | | 8/2001 | Gates |
| 6,282,881 B1 | | 9/2001 | Beutin et al. |
| 6,942,181 B2 | | 9/2005 | Dionne |
| 7,090,165 B2 | | 8/2006 | Jones et al. |
| 2004/0238687 A1 | * | 12/2004 | Jones et al. .................. 244/62 |
| 2004/0255572 A1 | * | 12/2004 | Porte ........................ 60/226.1 |
| 2005/0150970 A1 | | 7/2005 | Beutin et al. |

FOREIGN PATENT DOCUMENTS

GB 2 085 082 A 2/1980
WO 03/037715 A1 5/2003

* cited by examiner

*Primary Examiner*—Michael Cuff
*Assistant Examiner*—Phutthiwat Wongwian
(74) *Attorney, Agent, or Firm*—McNees Wallace & Nurick, LLC

(57) ABSTRACT

A gas turbine engine includes an engine core extending along a core axis, a cooling-air delivery duct on the engine core, and a removable nacelle cowl overlying the engine core. A cooling-air nacelle-cowl duct delivers cooling air to the cooling-air delivery duct. At least a portion of the length of the cooling-air nacelle-cowl duct is integral with the nacelle cowl and not directly supported on the engine core.

21 Claims, 4 Drawing Sheets

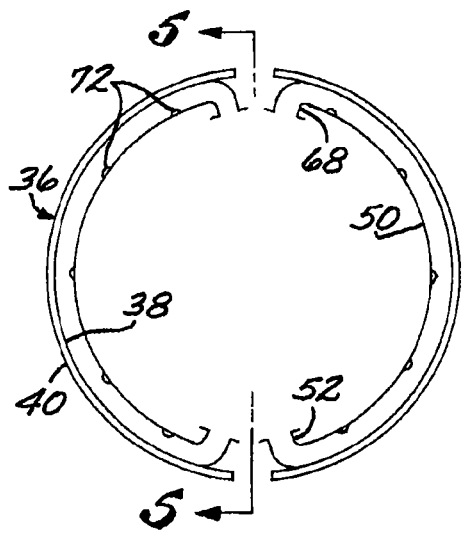
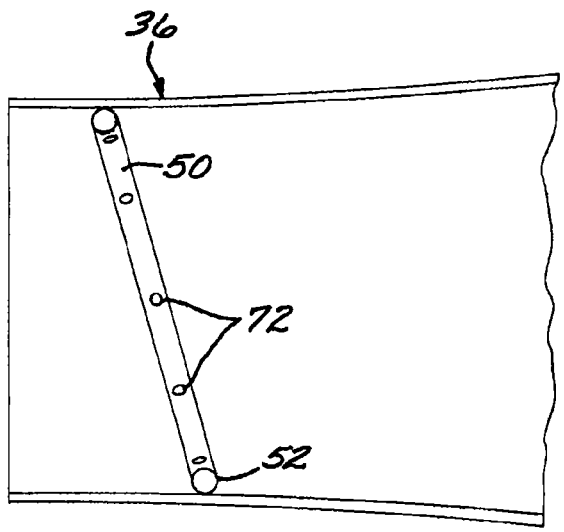
FIG.4  FIG.5
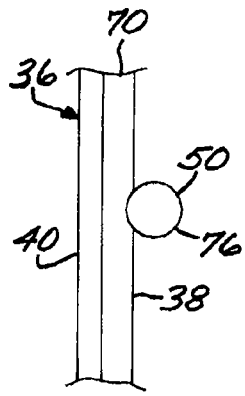 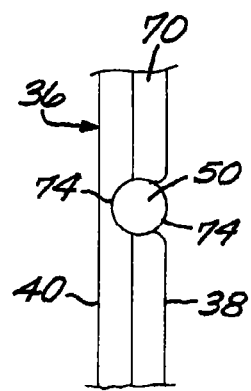 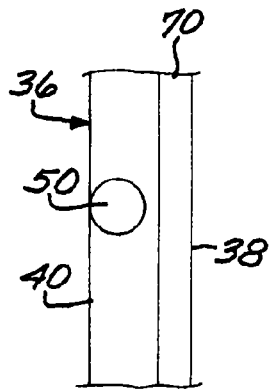
FIG.6  FIG.7  FIG.8
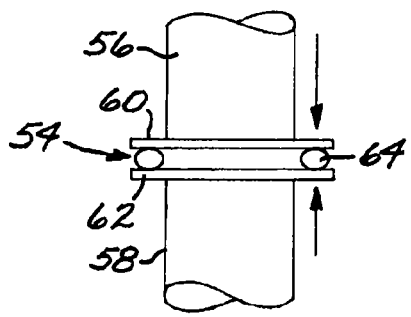
FIG.9

GAS TURBINE ENGINE HAVING A COOLING-AIR NACELLE-COWL DUCT INTEGRAL WITH A NACELLE COWL

This invention generally relates to the structure of a gas turbine engine and, more particularly, to the support of a cooling-air nacelle-cowl duct on the nacelle cowl rather than on the engine core.

BACKGROUND OF THE INVENTION

A gas turbine engine, such as an aircraft gas turbine engine, may in principle include an engine core with an axial-flow compressor, fuel injectors, combustors, an axial-flow turbine, and a rearwardly facing combustion-gas outlet. There may be many stages of compressors and many stages of turbines. When the gas turbine engine is in operation, air is drawn into the engine and compressed by the compressor, and fuel is added to the compressed air by the fuel injectors. The mixture of fuel and compressed air is ignited in the combustors. The resulting hot gas combustion flows through the turbine, whose turning drives the compressor, and out of the rear of the engine through the combustion-gas outlet. More complex versions of the gas turbine engine use a large-diameter turbofan driven by the engine core to increase the mass flow of air through a fan duct. This simplified description of the principles of the gas turbine engine omits the myriad of detailed features of the engine structure.

Cooling air may be required at various compartments and locations of the engine core, such as for the high-pressure turbine active clearance control and the low-pressure turbine active clearance control and for engine compartment cooling, and for general cooling. The cooling air may be provided by bleeding air from the fan duct and delivering it to the required locations through ducts affixed to the engine core. Desirably, the cooling air is delivered to the required locations through duct structures that have weights that minimized to the extent possible and in which the cooling air is not heated any more than necessary.

The engine core may in principle be covered with pairs of nacelle cowls that are arranged in a clamshell fashion over the generally cylindrical engine core. The nacelle cowls may be removed, usually by pivoting the cowls on hinges, to provide access to the engine core for maintenance. When the nacelle cowl is removed, the mechanic is faced with a complex array of structures, pipes, and ducts. The most readily accessible components often inhibit access to those that are further from the surface of the exposed engine core.

There is a need for an alternative engine structure in which weight is reduced, engine performance is improved, and access to the engine core is improved.

SUMMARY OF THE INVENTION

The present invention fulfills this need, and further provides related advantages. The present invention provides a gas turbine engine in which cooling air is delivered through one or more cooling-air nacelle-cowl ducts that are integral with the nacelle cowl. This integral structure allows the weight of the cooling air ducts to be reduced without a loss in engine performance, in some cases by eliminating attachment structures, in some cases by causing the existing structure of the nacelle cowl to serve also as a part of the structure of the cooling-air nacelle-cowl duct, and in some cases by using the material of the cooling-air nacelle-cowl duct to stiffen the nacelle cowl. The cooling-air nacelle-cowl duct(s) integral with the nacelle cowl also are removed when the nacelle cowl is removed for access to the engine core, thereby improving the access to the components that otherwise would be partially obscured by the cooling-air nacelle-cowl duct if it were attached to the engine core.

In accordance with the invention, a gas turbine engine comprises an engine core extending along a core axis, and a removable nacelle cowl overlying the engine core. The nacelle cowl has an inner surface facing toward the engine core and an outer surface facing away from the engine core, when the removable nacelle cowl is installed to the engine core. A cooling-air intake structure receives cooling air through a cooling-air inlet in the nacelle cowl outer surface, and there is a cooling-air delivery duct on the engine core. A cooling-air nacelle-cowl duct is integral with the nacelle cowl. The cooling-air nacelle-cowl duct extends from the cooling-air intake structure to a location adjacent to the cooling-air delivery duct.

The cooling-air nacelle-cowl duct extends generally parallel to or circumferential to the core axis, or with an orientation between parallel and circumferential. A nacelle-cowl duct/delivery duct seal, for example in the form of a kiss seal, is between the cooling-air nacelle-cowl duct and the cooling-air delivery duct. The cooling-air nacelle-cowl duct may optionally include at least one cooling hole therethrough to permit the escape of air therefrom at a selected location.

Preferably, the cooling-air nacelle-cowl duct comprises at least 50 percent, more preferably at least 80 percent, and most preferably at least 90 percent of a duct-path distance from the cooling-air inlet to the cooling-air delivery duct.

The cooling-air nacelle-cowl duct may lie at least in part overlying the inner surface of the nacelle cowl. That is, the cooling-air nacelle-cowl duct lies between the inner surface of the nacelle cowl and the engine core, but is still integral with the nacelle cowl. The cooling-air nacelle-cowl duct may instead lie at least in part between the inner surface of the nacelle cowl and the outer surface of the nacelle cowl. That is, the cooling-air nacelle-cowl duct is within the nacelle cowl. The nacelle cowl may further include an insulation layer lying between the inner surface of the nacelle cowl and the outer surface of the nacelle cowl. The cooling-air nacelle-cowl duct lies between the outer surface of the nacelle cowl and the insulation layer in this case. The insulation layer insulates the cooling-air nacelle-cowl duct from the heat produced by the engine core, thereby preventing the excessive heating of the cooling air and improving the efficiency of the processes that use the cooling air.

In some versions, at least a portion of the cooling-air nacelle-cowl duct extends parallel to the core axis. In other versions, at least a portion of the cooling-air nacelle-cowl duct extends circumferential to the core axis.

In one preferred form, the cooling-air nacelle-cowl duct is radially adjacent to the cooling-air delivery duct and points radially inwardly toward the cooling-air delivery duct. This arrangement facilitates the use of the kiss seal. In some designs, there is an intake structure/duct seal, which may be a kiss seal, between the cooling-air intake structure and the cooling-air nacelle-cowl duct.

For some applications, it is desired to have an air-flow regulating valve in an air flow path extending from the cooling-air inlet to the cooling-air delivery duct and through the cooling-air nacelle-cowl duct. The air-flow regulating valve may be mounted to the engine core.

Alternatively stated, a gas turbine engine comprises an engine core extending along a core axis, a cooling-air delivery duct on the engine core, and a removable nacelle cowl overlying the engine core. The nacelle cowl has an inner surface facing toward the engine core and an outer surface facing away from the engine core, when the removable nacelle cowl is installed to the engine core. A cooling-air nacelle-cowl duct delivers cooling air to the cooling-air delivery duct. At least a portion of the length of the cooling-air nacelle-cowl duct is integral with the nacelle cowl and not directly supported on the engine core. Other compatible features discussed herein may be used with this embodiment.

The present approach positions a major portion of the air-flow duct integral with the nacelle cowl, reducing the total weight of the gas turbine engine, an important advantage for aircraft gas turbine engines. The air-flow duct integral with the nacelle cowl also improves visual and repair access to other components of the engine during engine assembly and maintenance, because the air-flow ducts are moved away from the engine core with the nacelle cowl.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a schematic sectional view of the gas turbine engine with the third routing of FIG. 3, taken on line 4-4;

FIG. 5 is an interior elevational schematic view of the gas turbine engine of FIG. 4, taken on line 5-5;

FIG. 6 is an enlarged sectional schematic view of a first form of the cooling-air nacelle-cowl duct in relation to the nacelle cowl;

FIG. 7 is an enlarged sectional schematic view of a second form of the cooling-air nacelle-cowl duct in relation to the nacelle cowl;

FIG. 8 is an enlarged schematic sectional view of another form of the cooling-air nacelle-cowl duct in relation to the nacelle cowl; and FIG. 9 is a schematic side-elevational view of a kiss seal.

DETAILED DESCRIPTION OF THE INVENTION

Figure 1:
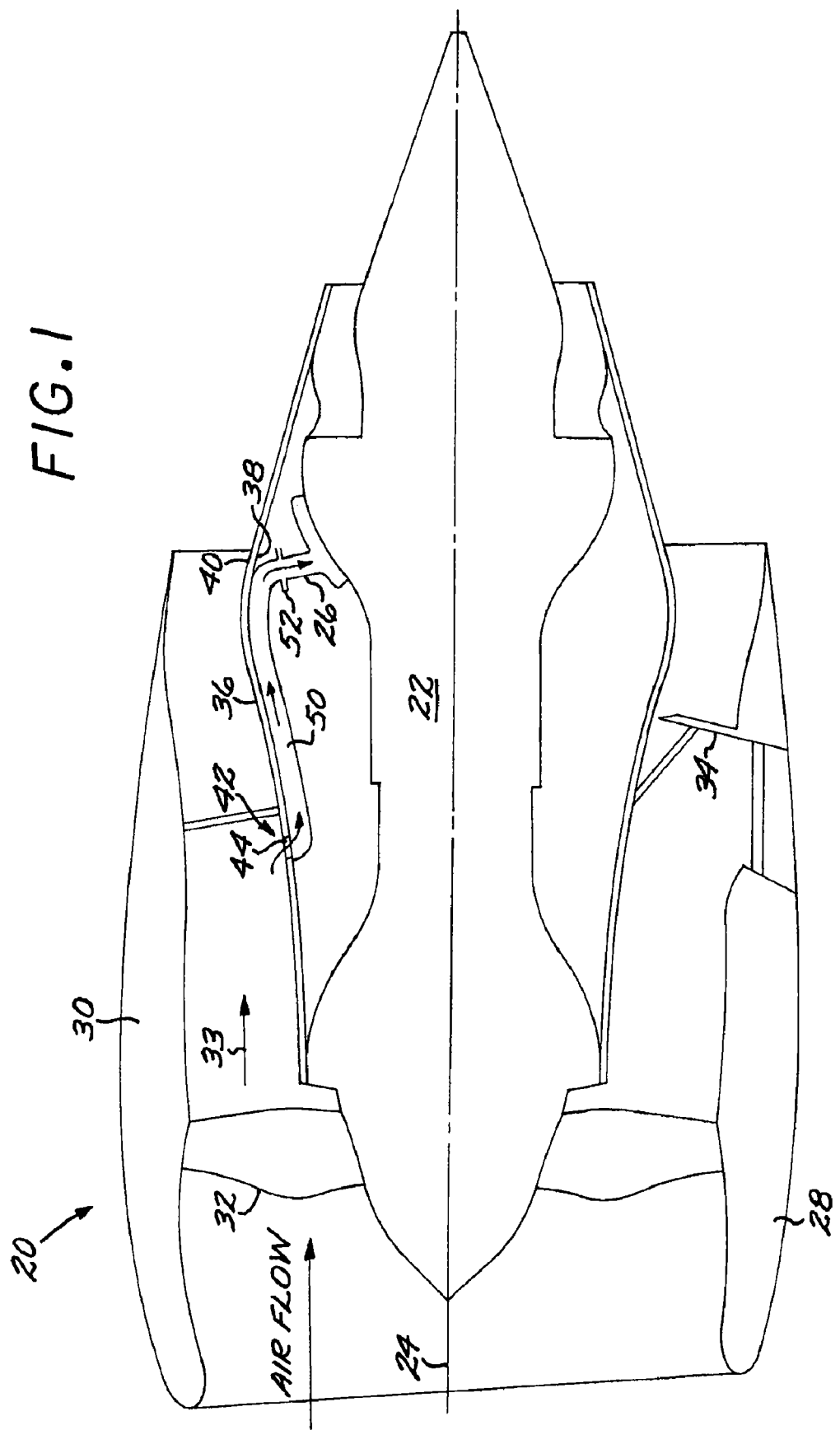
FIG. 1 is a partially sectioned schematic side view of a gas turbine engine, illustrating a first routing of the cooling-air nacelle-cowl duct integral with the nacelle cowl.
Figure 2:
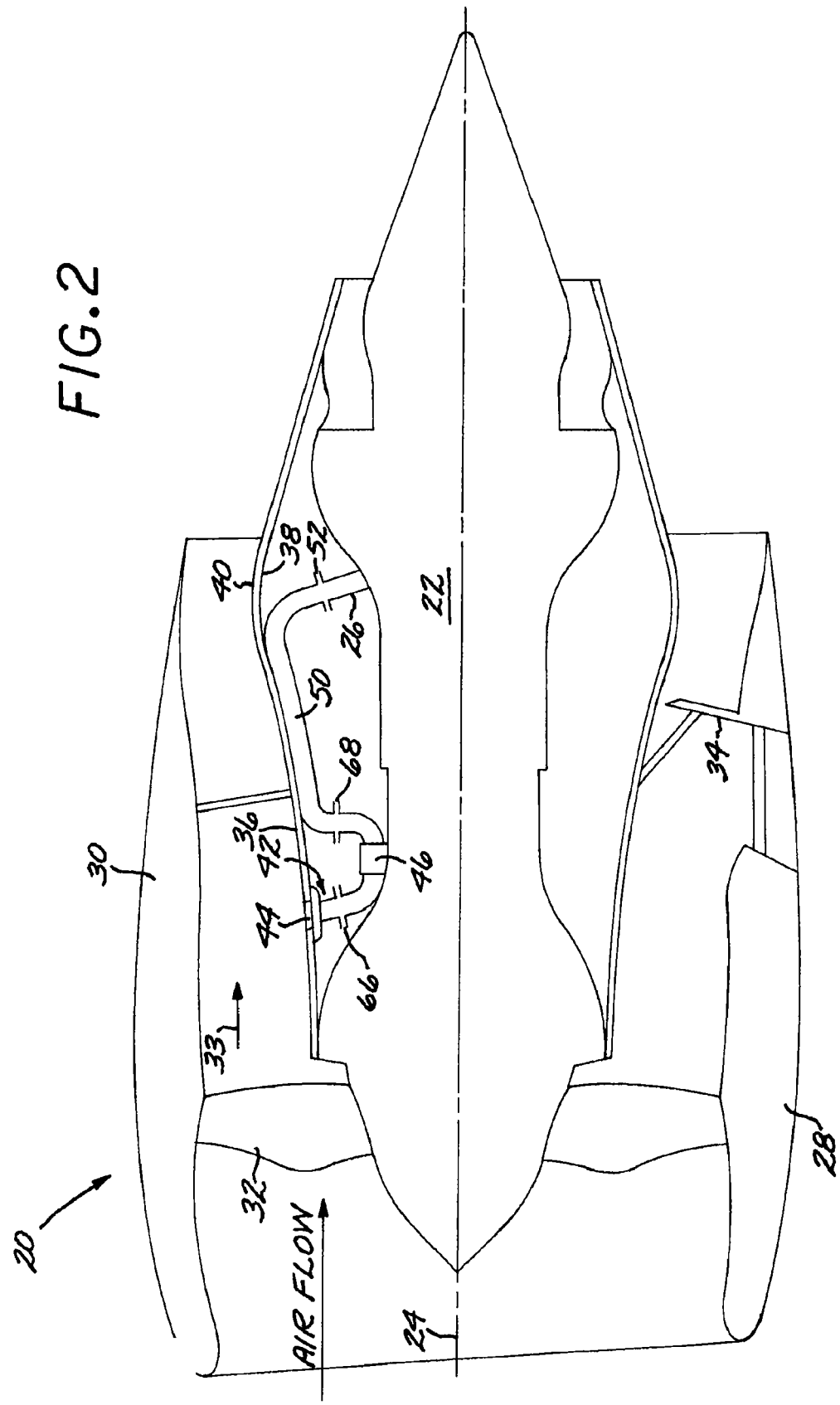
FIG. 2 is a partially sectioned schematic side view of a gas turbine engine, illustrating a second routing of the cooling-air nacelle-cowl duct integral with the nacelle cowl.
Figure 3:
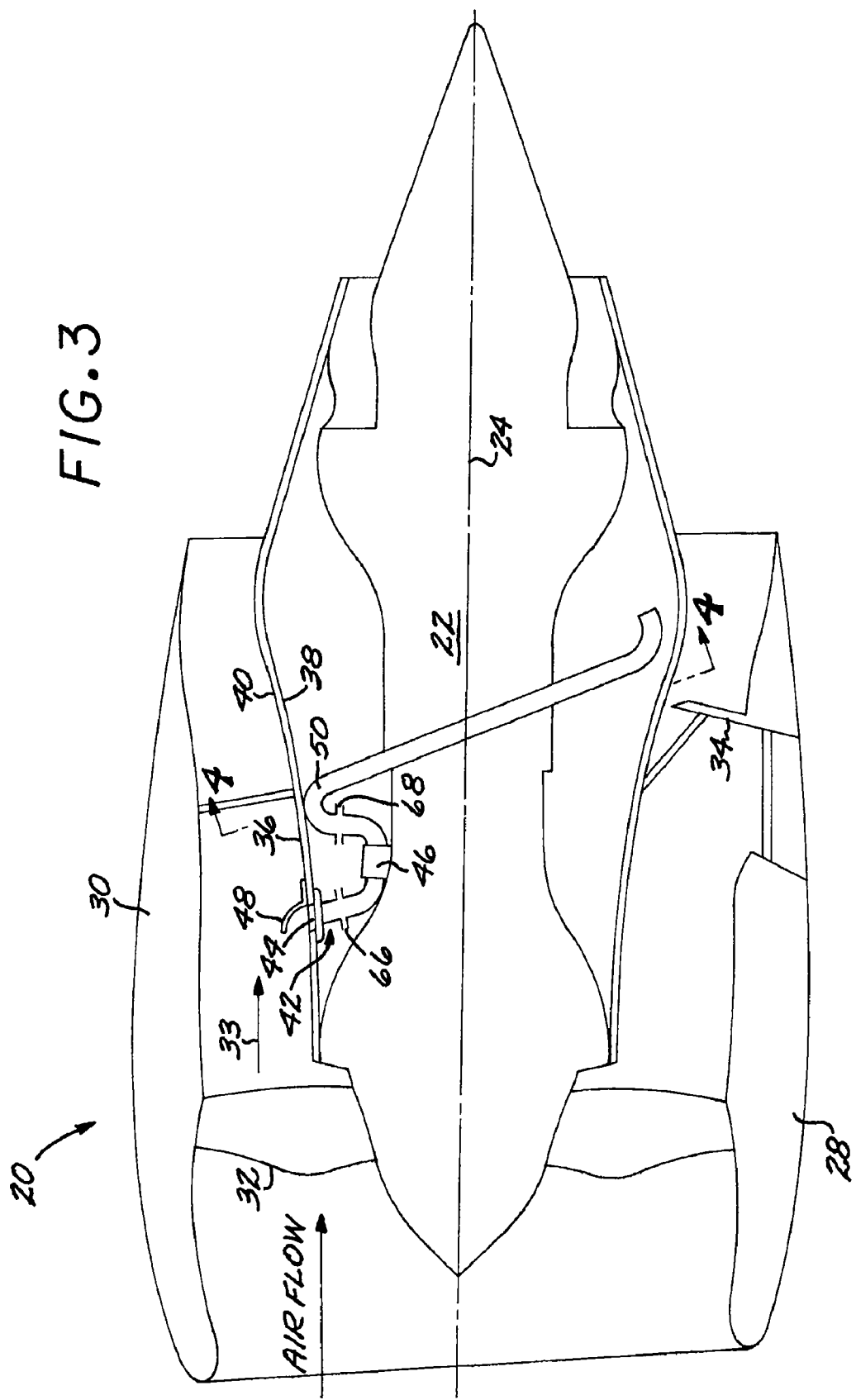
FIG. 3 is a partially sectioned schematic side view of a gas turbine engine, illustrating a third routing of the cooling-air nacelle-cowl duct integral with the nacelle cowl.

FIGS. 1-3 depict a preferred embodiment of a gas turbine engine 20, in this case an aircraft gas turbine engine. The gas turbine engine 20 comprises an engine core 22 extending along a core axis 24. The internal details of the engine core 22 are not shown. The engine core 22 generally includes a combustion air intake, an axial-flow compressor that compresses the combustion air, fuel injectors that introduce fuel into combustors that mix and ignite the combustion air and fuel to produce combustion gas, an axial-flow turbine through which the combustion gas passes, a rearwardly facing combustion-gas outlet through which the combustion gas passes after the axial-flow turbine, a compressor-drive shaft that transmits power from the axial-flow turbine to the axial-flow compressor, and the associated instrumentation, control, and piping systems. Some portions of the engine core 22 require a flow of cooling air that may be delivered through a cooling-air delivery duct 26 mounted on the engine core 22.

The form of gas turbine engine 20 illustrated in FIGS. 1-3 also includes a bypass fan structure 28 overlying the forward end of the engine core 22. The bypass fan structure 28 includes a bypass fan housing 30, a bypass fan 32 that is driven by a fan-drive shaft (not shown) from the axial-flow turbine of the engine core 22 and produces a fan air flow 33, and in this case the thrust reversers 34. Only a single bypass fan stage is illustrated, but there may be multiple stages.

A removable nacelle cowl 36 overlies the engine core 22, but not the bypass fan structure 28. The nacelle cowl 36 has an inner surface 38 facing toward the engine core 22 and an outer surface 40 facing away from the engine core 22, when the removable nacelle cowl 36 is installed to the engine core 22 as shown in FIGS. 1-3. Access to the portion of the engine core 22 that is covered by the nacelle cowl 36 is achieved by removing the bypass fan housing 30, and then removing the nacelle cowl 36. The nacelle cowl 36 is typically in the form of a two-part clamshell, with each half of the nacelle cowl 36 hinged to the support (not shown) of the gas turbine engine 20 and locked to the engine core 22 at the unhinged end. Removal of the nacelle cowl 36 is accomplished by unlocking the unhinged end of each half of the clamshell, and pivoting it away from the engine core 22 on its hinges. The present invention is operable with other structures for mounting the nacelle cowl 36.

A cooling-air intake structure 42 receives cooling air through a cooling-air inlet 44 in the nacelle cowl outer surface 40. In the illustrated embodiment, the cooling air inlet 44 receives its air supply from the fan air flow 33. If the gas turbine engine 20 were of the turbojet type that does not include a turbofan, the cooling air inlet would collect outside air. In the embodiment of FIG. 1, the cooling-air intake structure 42 includes only the cooling air inlet 44. In the embodiment of FIG. 2, the cooling-air intake structure 42 further includes an air flow-regulating valve 46 that is mounted to the engine core 22. In the embodiment of FIG. 3, the cooling-air intake structure 42 includes the air flow-regulating valve 46 mounted to the engine core 22, and additionally an air scoop 48 that projects into the fan air flow 33. These various features may be used in any operable combination in the several air-flow routings and with other routings within the scope of the present approach.

A cooling-air nacelle-cowl duct 50 is integral with the nacelle cowl 36. By "integral" is meant that the cooling-air nacelle-cowl duct 50 is directly affixed to and supported on the nacelle cowl 36. The cooling-air nacelle-cowl duct 50 is not directly affixed to and supported on the engine core 22. There may be an indirect connection between the cooling-air nacelle-cowl duct 50 and the engine core 22 through the support structure of the nacelle cowl 36 and the engine core 22, but there is no direct connection therebetween.

The cooling-air nacelle-cowl duct 50 extends from the cooling-air intake structure 42 to a location adjacent to the cooling-air delivery duct 26. In some routing configurations, the cooling-air nacelle-cowl duct 50 extends largely parallel to the core axis 24, see the duct routing of FIGS. 1-2. In other configurations, the cooling-air nacelle-cowl duct 50 extends largely circumferential relative to the core axis 24, see the duct routing of FIGS. 3-5. Mixed paths involving both parallel and circumferential routing, and angular orientations between parallel and circumferential, may also be used.

In a related application, the cooling-air nacelle-cowl duct 50 may also, or instead, include cooling holes 72 that allow air to flow out of the cooling-air nacelle-cowl duct 50 to cool the engine directly. The flow of cool air through the cooling holes 72 is used to directly cool the structures adjacent the cooling holes 72. FIGS. 4-5 illustrate such an application where air is allowed to flow out of the cooling-air nacelle-cowl duct 50 through one or more cooling holes 72 spaced along its length. Cooling air flows from the airflow-regulating valve 46 through a seal 68, through the cooling-air nacelle cowl duct 50, and to the cooling-air delivery duct 26 (not shown) through a nacelle-cowl duct/delivery duct seal 52. (This same seal and duct approach may be used with the configuration of FIG. 2.) However, the air flow through the cooling-air nacelle-cowl duct 50 may be forced entirely through the cooling holes 72, by sealing the end of the cooling-air nacelle-cowl duct 50 and omitting the nacelle-cowl duct/delivery duct seal 52.

It is preferred that the cooling-air nacelle-cowl duct 50 comprises at least 50 percent, more preferably at least 80 percent, and most preferably at least 90 percent, of a duct-path distance from the cooling-air inlet 44 to the cooling-air delivery duct 26. This large fraction of the duct path distance allows a significant reduction in duct weight and also improved access to the remaining components of the engine core 22 when the nacelle cowl 36 is removed. The duct-path distance is the distance from the cooling-air inlet 44 to the cooling-air delivery duct 26 as measured along the centerline of the ducting that extends from the cooling-air inlet 44 to the cooling-air delivery duct 26. In some routing configurations, such as in FIG. 1, the entire duct-path distance is through the cooling-air nacelle-cowl duct 50. In other routing configurations, such as in FIGS. 2-3, a small fraction of the duct-path distance is through the cooling-air inlet structure 42 that may include some duct and also components such as the air-flow regulating valve 46.

To allow the nacelle cowl 36 with its integral cooling-air nacelle-cowl duct 50 to be expeditiously removed from the engine core 22, the nacelle-cowl duct/delivery duct seal 52 is positioned between the cooling-air nacelle-cowl duct 50 and the cooling-air delivery duct 26. The nacelle-cowl duct/delivery duct seal 52 may be of any operable type. To facilitate the structure of the nacelle-cowl duct/delivery duct seal 52, it is preferred that the cooling-air nacelle-cowl duct 50 be radially adjacent to the cooling-air delivery duct 26 with the open ends of the two ducts 50 and 26 in facing relationship to each other. "Radially adjacent" refers to the radial direction relative to the core axis 24, which radial direction is perpendicular to the core axis 24.

The nacelle-cowl duct/delivery duct seal 52 is preferably a kiss seal. A kiss seal does not require the use of mechanical fasteners to accomplish the seal, an important advantage where it is important to be able to remove the nacelle cowl 36 easily from the engine core 22. The cooling-air nacelle-cowl duct 50 delivers air that is relatively cool, usually at the fan air temperature in the bypass duct or ram air at ambient temperature, and is at a relatively low pressure. The nacelle-cowl duct/delivery duct seal 52 need not be hermetic, and small leakages of cooling air are tolerated. The seal demands are therefore not great. Kiss seals are known in the art for other applications and may also be used in the present application.

FIG. 9 depicts a typical kiss seal 54, between two exemplary ducts 56 and 58, that may be used in the present approach for the nacelle-cowl duct/delivery duct seal 52. The kiss seal 54 includes respective facing flanges 60 and 62 on the ends of the ducts 56 and 58. A seal ring 64 such as an annular ring of an elastomer is affixed to one of the flanges 60 or 62 and extends around the circumference of the flanges 60 and 62. When the two ducts 56 and 58 are pushed together with their associated flanges 60 and 62 in facing relation, the seal ring 64 is compressed between the flanges 60 and 62 so as to provide a reasonably good seal that prevents leakage of the air flow at the kiss seal 54. The kiss seal is also relatively tolerant of small misalignments of the ducts 56 and 58, as may be experienced when the nacelle cowl 36 is installed to the engine core 22.

Depending on the exact routing, the extent of the nacelle cowl 36, and the position of the cooling air inlet 44 in relation to the removable nacelle cowl 36, additional seals may be required. In the routing configuration of FIG. 1, only the nacelle-cowl duct/delivery duct seal 52 is required. In the routing configurations of FIGS. 2 and 3, two additional seals 66 and 68 are required because the airflow-regulating valve 46 is mounted to the engine core 22. The seal 68 is an intake structure/duct seal between the cooling-air intake structure 42 and the cooling-air nacelle-cowl duct 50, and the seal 66 is within the cooling-air intake structure 42. The additional seals 66 and 68 may be of the same type as discussed above in relation to FIG. 9 and kiss seal 54, or they may be of another operable configuration. Other routing configurations with even more kiss seals may be envisioned. In each case, the use of the kiss seal or other type of easily separable seal, that does not require the use of mechanical fasteners to accomplish the seal, is preferred.

The cooling-air nacelle-cowl duct 50 may have any operable structural mounting relationship to the nacelle cowl 36. FIGS. 6-8 illustrate three such structural mounting relationships. In each of the illustrated cases, the nacelle cowl 36 includes the inner surface 38, the outer surface 40, and an optional layer of insulation 70 lying between the inner surface 38 and the outer surface 40.

In the structure of FIG. 6, the cooling-air nacelle-cowl duct 50 lies at least in part overlying the inner surface 38 of the nacelle cowl 36 in a surface-mount configuration. That is, the inner surface 38 lies between the cooling-air nacelle-cowl duct 50 and the outer surface 40. The cooling-air nacelle-cowl duct 50 for this structure of FIG. 6 is typically a freestanding piece of piping 76.

In the structure of FIG. 7, the cooling-air nacelle-cowl duct 50 lies at least in part (and in this case entirely) between the inner surface 38 of the nacelle cowl 36 and the outer surface 40 of the nacelle cowl 36. In the illustrated case, the cooling-air nacelle-cowl duct 50 is affixed to the interior side of the outer surface 40 of the nacelle cowl 36. The cooling-air nacelle-cowl duct 50 for this configuration may be a freestanding piece of piping as in the structure of FIG. 6. It may instead be constructed in conjunction with the structural elements of the nacelle cowl 36. If, for example, the nacelle cowl 36 is made of a composite material, the form of the cooling-air nacelle-cowl duct 50 may be made by configuring plies 74 of the composite material to define the cooling-air nacelle-cowl duct 50. This approach may save a substantial amount of weight. The cooling-air nacelle-cowl duct 50 may also be made non-circular in cross-sectional shape.

In the structure of FIG. 8, the cooling-air nacelle-cowl duct 50 lies between the outer surface 40 of the nacelle cowl 36 and the insulation layer 70. In the illustrated structure, the cooling-air nacelle-cowl duct 50 is affixed to the inwardly facing side of the outer surface 40, so that the insulation layer 70 lies between the cooling-air nacelle-cowl duct 50 and the inner surface 38. The cooling-air nacelle-cowl duct 50 may be of the freestanding type as illustrated in FIG. 6 or the ply-formed type as illustrated in FIG. 7. In the approach of FIG. 8, the insulation layer 70 inhibits heating of the cooling air flowing in the cooling-air nacelle-cowl duct 50 by the heat flowing outwardly from the engine core 22. It is preferred to keep the air flowing in the cooling-air nacelle-cowl duct 50 as low as possible for thermodynamic efficiency in its ultimate uses.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A gas turbine engine comprising:
an engine core extending along a core axis; a removable nacelle cowl overlying the engine core, wherein the nacelle cowl has an inner surface facing toward the engine core and an outer surface facing away from the engine core, when the removable nacelle cowl is installed to the engine core;
a cooling-air intake structure that receives cooling air through a cooling-air inlet in the nacelle cowl outer surface;
a cooling-air delivery duct on the engine core;
a cooling-air nacelle-cowl duct directly affixed to and supported on the inner surface of the nacelle cowl, extending from the cooling-air intake structure to a location adjacent to the cooling-air delivery duct; and
a nacelle-cowl duct/delivery duct seal between the cooling-air nacelle-cowl duct and the cooling-air delivery duct.

2. The gas turbine engine of claim 1, wherein the cooling-air nacelle-cowl duct comprises at least 80 percent of a duct-path distance from the cooling-air inlet to the cooling-air delivery duct.

3. The gas turbine engine of claim 1, wherein the nacelle-cowl duct/delivery duct seal is a kiss seal.

4. The gas turbine engine of claim 1, wherein the cooling-air nacelle-cowl duct lies at least in part overlying the inner surface of the nacelle cowl.

5. The gas turbine engine of claim 1, wherein the cooling-air nacelle-cowl duct lies at least in part between the inner surface of the nacelle cowl and the outer surface of the nacelle cowl.

6. The gas turbine engine of claim 1, wherein the nacelle cowl further includes an insulation layer lying between the inner surface of the nacelle cowl and the outer surface of the nacelle cowl, and wherein the cooling-air nacelle-cowl duct lies between the outer surface of the nacelle cowl and the insulation layer.

7. The gas turbine engine of claim 1, wherein at least a portion of the cooling-air nacelle-cowl duct extends parallel to the core axis.

8. The gas turbine engine of claim 1, wherein at least a portion of the cooling-air nacelle-cowl duct extends circumferential to the core axis.

9. The gas turbine engine of claim 1, wherein the cooling-air nacelle-cowl duct is radially adjacent to the cooling-air delivery duct.

10. The gas turbine engine of claim 1, further including an intake structure/duct seal between the cooling-air intake structure and the cooling-air nacelle-cowl duct.

11. The gas turbine engine of claim 1, further including an intake structure/duct kiss seal between the cooling-air intake structure and the cooling-air nacelle-cowl duct.

12. The gas turbine engine of claim 1, further including an air-flow regulating valve in an air flow path extending from the cooling-air inlet to the cooling-air delivery duct and through the cooling-air nacelle-cowl duct, wherein the air-flow regulating valve is mounted to the engine core.

13. The gas turbine engine of claim 1, wherein the cooling-air nacelle-cowl duct has at least one cooling hole therethrough to permit the escape of air therefrom.

14. A gas turbine engine comprising: an engine core extending along a core axis;
a cooling-air delivery duct on the engine core: a removable nacelle cowl overlying the engine core, wherein the nacelle cowl has an inner surface facing toward the engine core and an outer surface facing away from the engine core, when the removable nacelle cowl is installed to the engine core; a cooling-air intake structure that receives cooling air through a cooling-air inlet in the nacelle cowl outer surface; and
a cooling-air nacelle-cowl duct that delivers the cooling air to the cooling-air delivery duct, wherein at least a portion of the length of the cooling-air nacelle-cowl duct directly affixed to and supported on the inner surface of the nacelle cowl.

15. The gas turbine engine of claim 14, wherein the cooling-air nacelle-cowl duct extends from the cooling-air intake structure to a location adjacent to the cooling-air delivery duct and extends parallel to or circumferential to the core axis, and
a nacelle-cowl duct/delivery duct seal between the cooling-air nacelle-cowl duct and the cooling-air delivery duct.

16. The gas turbine engine of claim 14, wherein the cooling-air nacelle-cowl duct extends from the cooling-air intake structure to a location adjacent to the cooling-air delivery duct and extends parallel to or circumferential to the core axis, and
a nacelle-cowl duct/delivery duct kiss seal between the cooling-air nacelle-cowl duct and the cooling-air delivery duct.

17. The gas turbine engine of claim 14, wherein the cooling-air nacelle-cowl duct extends from the cooling-air intake structure to a location adjacent to the cooling-air delivery duct and extends parallel to or circumferential to the core axis, and wherein the cooling-air intake structure and the cooling-air nacelle-cowl duct define a cooling-air path extending between the cooling-air inlet and the cooling-air delivery duct, a nacelle-cowl duct/delivery duct seal between the cooling-air nacelle-cowl duct and the cooling-air delivery duct, and at least one additional seal lying in the cooling-air path.

18. The gas turbine engine of claim 14, wherein the cooling-air nacelle-cowl duct comprises at least 80 percent of a duct-path distance from the cooling-air inlet to the cooling-air delivery duct.

19. The gas turbine engine of claim 14, wherein the cooling-air nacelle-cowl duct lies at least in part overlying the inner surface of the nacelle cowl.

20. The gas turbine engine of claim 14, wherein the cooling-air nacelle-cowl duct lies at least in part between the inner surface of the nacelle cowl and the outer surface of the nacelle cowl.

21. A gas turbine engine comprising:
an engine core extending along a core axis; a removable nacelle cowl overlying the engine core, wherein the nacelle cowl has an inner surface facing toward the engine core and an outer surface facing away from the engine core, when the removable nacelle cowl is installed to the engine core;
a cooling-air intake structure that receives cooling air through a cooling-air inlet in the nacelle cowl outer surface; and
a cooling-air nacelle-cowl duct fluidly coupled to the cooling-air intake structure having cooling holes therein, wherein at least a portion of the length of the cooling-air nacelle-cowl duct directly affixed to and supported on the inner surface of the nacelle cowl.

* * * * *